United States Patent [19]

Sharanov et al.

[11] 3,912,487
[45] Oct. 14, 1975

[54] APPARATUS FOR PRODUCING GRANULATED SLAG

[76] Inventors: Mikhail Alexeevich Sharanov, Tekhnologicheskaya ulitsa, 3, kv. 19; Gennady Alexeevich Silukov, ulitsa Malysheva, 21, kv. 100; Valentin Petrovich Khainovsky, Tekhnologicheskaya ulitsa, 3, kv. 26, all of Sverdlovsk; Felix Yanovich Olginsky, ulitsa Bazhova, 1, kv. 87, Moscow; Vladimir Alexeevich Solovykh, prospekt Mira, 188, kv. 54, Moscow; Alexandr Efimovich Sukhorukov, Prostornaya ulitsa, 34, korpus 1, kv. 74, Moscow, all of U.S.S.R.

[22] Filed: June 24, 1974

[21] Appl. No.: 482,163

[52] U.S. Cl. ........................... 65/141; 65/19; 75/24; 210/196; 210/307
[51] Int. Cl.[2] ...................... C03B 5/18; C03B 19/08
[58] Field of Search ........ 210/196, 307; 65/19, 141; 75/24

[56] References Cited
UNITED STATES PATENTS

| | | | |
|---|---|---|---|
| 3,523,015 | 8/1970 | Grady | 65/19 |
| 3,531,269 | 9/1970 | Grady | 65/19 |
| 3,615,329 | 10/1971 | Jones | 65/141 |
| 3,645,708 | 2/1972 | Grady | 65/19 |
| 3,738,820 | 6/1973 | Osborn et al. | 65/19 |

*Primary Examiner*—Robert L. Lindsay, Jr.
*Attorney, Agent, or Firm*—Waters, Schwartz & Nissen

[57] ABSTRACT

The present invention relates to fluid slag processing and may be utilized to the best advantage in the case of melting furnaces with a volume of upwards of 3,000 $m^3$.

The proposed apparatus comprises a bunker directed into which is a flow of pulp, said bunker having a slab rigidly secured to its walls, said slab being disposed outside the zone of direct impact of the downward pulp flow and being partially immersed with its edge into the water found in the bunker. The water level in the bunker must be no less than 100 mm from the bottom of the pulp supplying chute. Arranged behind the slab and adjoining it is a grate for catching light suspended matter of the pulp; adjoining said grate is an overflow wall for the overflow of clarified water into a container. The compact apparatus ensures a continuous and evenly developing process of producing granulated slag.

3 Claims, 5 Drawing Figures

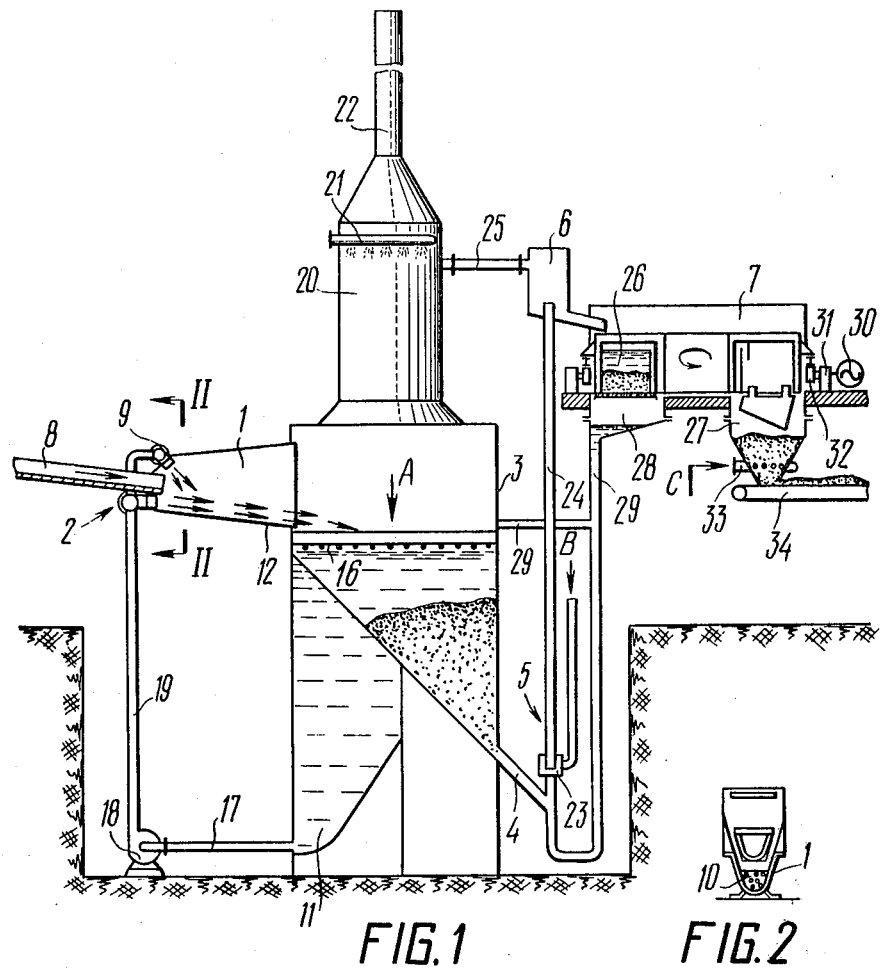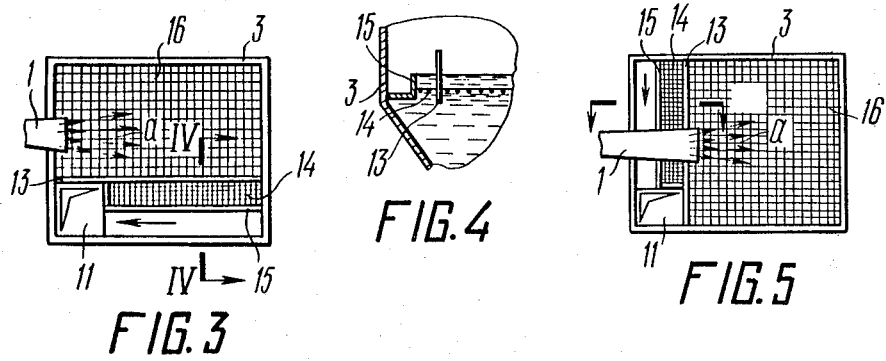

APPARATUS FOR PRODUCING GRANULATED SLAG

The present invention relates to apparatus for the processing and removal of fluid slags produced in melting furnaces and, more particularly, to apparatus for the production of granulated slag.

The invention may be utilized to the best advantage in the processing of fluid slag directly in the course of discharging said slag from a blast furnace having a volume of upwards of 3,000 m³; the invention, however, is equally applicable in the case of any melting furnace wherein fluid slag is produced.

Known at present are apparatus for the production of granulated slag, said apparatus being found outside melting furnaces and at a considerable distance (upwards of 1.5 km) therefrom. Fluid slag is supplied to these apparatus in locomotive-driven slag ladles. Apparatus of this type comprise a chute, supplied whereto simultaneously are water for fluid slag granulation, and fluid slag which is supplied directly from slag ladles. The pulp produced in the course of the granulation is distributed over an open area, wherefrom granulated slag, which has been preliminarily heaped up, is loaded with the aid of clamshells into railroad cars to be delivered to consumers (in particular, to cement-producing plants). The water is collected, by gravity, in settlers which are made sectional for better clarification of the water.

While being transported in ladles, fluid slag is cooled, the resulting skull amounting to 20 percent, and even more, of the entire slag volume. This impairs the quality of the granulated slag as a raw material for cement production. In addition, the skull formation considerably affects the quality of the slag used for granulation; then, the skull has to be knocked out of the ladles. Moreover, granulated slag obtained with the use of the known apparatus possesses a heterogeneous granulometric composition, whereas its humidity reaches 30 percent. This reduces the load capacity of railraod cars and of drier furnaces at cement plants. Besides, apparatus of the foregoing type require large production areas, a ramified network of rail communications and a numerous personnel.

The above disadvantages may be partially obviated if an apparatus for the production of granulated slag be brought closer to melting furnaces, and if the pulp produced in the course of granulation is received in bunkers.

There are also known apparatus for the production of granulated slag, which comprise a closed chute for the supply thereinto of fluid slag from melting furnaces, said chute having a granulator disposed at the intake portion thereof for the granulation, under the action of a flow of water, of fluid slag inside said chute. Hermetically connected to the outlet portion of said chute is a bunker to receive the downward flow of pulp produced in the course of granulation. Connected to the lower portion of said bunker is an airlift to receive the pulp and forward it to a dehydration and drying means in order to obtain dehydrated granulated slag (cf. USSR Inventor's Certificate No. 183,776, Cl. 21 b, 3/08). In such apparatus, a container for the accumulation of clarified water is found outside the bunker and communicating with the granulator by a substantially long pipeline.

Although the latter apparatus are more compact, as compared to those described above, and make it possible to obtained granulated slag with required granulometric properties and reduced humidity, they, too, have serious disadvantages.

First of all, these are periodic-action apparatus, for the supply of fluid slag into the chute is done periodically; the airlift which transports all the pulp produced in the course of granulation also functions periodically. In addition, these apparatus are used, as a rule, in the case of low-capacity melting furnaces with a low yield of fluid slag. When used in conjunction with big melting furnaces, such apparatus would require powerful airlifts to ensure transportation of the entire pulp produced in the course of granulation.

Besides, the use of such apparataus in conjunction with large-capacity melting furnaces necessitates the inclusion in the dehydration and drying means of several settler bunkers. In turn, the fact that each settler binkers performs the operations of pulp loading, water filtering and the unloading of granulated slag necessitates a number of mechanisms for switching a respective settler- bunker for a required operation. The presence of such mechanisms, however, makes the apparatus more difficult to service and reduces its operational reliability.

There is also a chance of the airlift being put out of action due to the clogging thereof with large-size lumps of alien materials and of slag crust which may be brought thereinto with the pulp.

It is an object of the present invention to eliminate the foregoing disadvantages.

The invention aims at providing an apparatus for the production of granulated slat which would ensure a continuous and evenly developing process of the production of granulated slag irrespective of the discharge time and the volume of fluid slag.

It is an important object of the present invention to provide an apparatus which could be used in conjunction with melting furnaces of any volume and capacity.

Another object of the invention is to provide an apparatus which would make it possible to collect clarified water in immediate proximity to the bunker so that this water may be subsequently utilized for slag granulation.

It is still another object of the present invention to provide a small-size, compact apparatus.

It is yet another object of the present invention to provide an apparatus that would make it possible to bring down the power of airlifts and pumping means and sharply reduce the length of pressure piping systems.

The foregoing and other objects of the present invention are attained in an apparatus for the production of granulated slag, comprising a closed chute for the supply thereinto of fluid slag from melting furnaces, said chute having a granulator at the intake portion thereof which granulates said slag inside said chute under the action of a flow of water, whereas connected hermetically of the outlet portion of said chute is a bunker to receive the downward flow of pulp produced in the course of the granulation, said bunker having an airlift connected to the lower portion thereof to receive the pulp and forward it to a dehydration and drying means in order to obtain granulated slag, said bunker being filled, in accordance with the invention, with water, the water level being no less than 100 mm from the bottom of the chute at its outlet portion, said bunker having a slab rigidly secured to its walls, said slab being disposed outside the zone of direct action of the downward pulp flow and being partially immersed with its edge into the water, whereas arranged behind said slab, in the direction off said zone and below said water level is a grate adjoining said slab for catching light suspended matter in the pulp, adjoin whereto is an overflow wall for the overflow of clarified water into a container communicating with said bunker. The proposed apparatus makes it possible to obtain clarified water and thickened pulp with a concentration of the solid and fluid pulp phases of 1:1 or 1:2, as opposed to a concentration of the solid and fluid pulp phases of 1:6 and upwards obtained in conventional apparatus. The latter is due to the fact that the downward pulp flow strikes against the surface of the water and the slab, whereby its kinetic energy is damped; as a result, granulated slag, which is a heavier phase, is accumulated in the lower portion of the bunker. Clarified water over the overflow wall and is accumulated in the container. The thickened pulp thus obtained, i.e., pulp mixed with a minimum quantity of water, makes it possible to employ a low-power airlift. In addition, the dehydration and drying means no longer necessitates the use of several settler-bunker and, consequently, of additional mechanisms.

In turn, the division of the pulp flow into clarified water and thickened pulp makes it possible to accumulate said pulp irrespective of the periodicity of the fluid slag supply. The pulp accumulation enables the airlift to supply it to the dehydration and drying means, ensuring thereby a continuous and evenly developing process of the production of granulated slag. The accumulation of clarified water in the container in immediate proximity to the bunker accounts for the compactness of the apparatus and makes is possible to employ substantially less powerful pumping means.

In order to make the apparatus still more compact and sharply reduce the length of the pressure piping, it is expedient that the container for the accumulation of clarified water should be connected at its power portion to a pump for the supply of said water to the granulator.

In order to improve the operation of the aircraft and prolong its service life, it is expedient that there should be installed in the zone of direct action of the downward pulp flow and below said water level another grate for catching and crushing large-size lumps of alien materials and slag crust.

The objects and advantages of the present invention will become more apparent from the following detailed description of a preferred embodiment thereof when read in conjunction with the accompanying drawings, wherein:

FIG. 1 is a lateral, longitudinally cut view of the proposed apparatus for the production of granulated slag;
FIG. 2 is a section along line II—II of FIG. 1;
FIG. 3 is a view taken along arrow A of FIG. 1;
FIG. 4 is a section along line IV—IV of FIG. 3;
FIG. 5 shows an alternative mutual arrangement of the slab, grate and overflow wall (plan view).

Referring now to the attached drawings, the proposed apparatus comprises a closed chute 11 (FIG. 1) for the supply thereinto of fluid slag, said chute having a granulator 2 arranged at the intake portion thereof, whereas connected hermetically to the outlet portion of said chute is a bunker 3. Connected to the lower portion of said bunker by means of an inclined branch pipe 4 is an airlift 5 with a separator 6 arranged at the upper portion thereof, said separator 6 being in communication with a dehydration and drying means 7.

Fluid slag is supplied from a melting furnace to the chute 1 through a nose 8 of a slag launder of the melting furnace (not shown).

The granulator 2 is made up of a collector 9 and a perforated slab 10 (FIG. 2) adjoining said collector and effecting, under the action of a flow of water, the granulation of fluid slag inside the chute 1. The resultant pulp is forwarded in a downward flow to the bunker 3. The bunker 3 has three inclined walls. Adjoining one of said walls is a container 11 (FIG. 1). The bunker 3 is filled with water whose level is no less than 100 mm from a bottom 12 of the chute 1 at its outlet portion.

The selection of said water level is aimed at ensuring maximum safety in the course of fluid slag granulation. It is permissible to fill the bunker with water up to a level which is somewhat lower than the above-mentioned one, provided that in order to damp the kinetic energy of the downward pulp flow and minimize the turbulence of the water surface, said pulp flow strikes the surface of the water instead of the bunker walls.

In addition, the foregoing water level limit is aimed at ensuring the accumulation of thickened pulp at the lower portion of the bunker and continuous discharge of said thickened pulp, as well as at obtaining clarified water with a degree of clarification sufficiently high to provide for reliable operation of the airlift and pumping means.

Secured directly to the walls of the bunker 3 is a slab 13 (FIG. 3), said slab being arranged outside the zone $a$ of the direct impact of the downward pulp flow and being partially immersed with its edge into the water, as is shown in FIG. 4. The slab 13 is largely intended for damping the water surface, which is conducive to water clarification. The fact that it is disposed outside the $a$ zone is meant to avoid the destruction of the slab and ensure a sufficient height thereof.

Arranged behind the slab 13, in the direction off the $a$ zone and below the water level, is a grate 14 for catching light suspended matter found in the pulp, said grate adjoining said slab 13. In turn, said grate is adjoined by an overflow wall 15 for the overflow of clarified water into the container 11.

In case the pulp contains large-size lumps of alien materials and slag crust, provision is made for a grate 16 which is arranged in the zone $a$, below the water level, and is meant to catch and crust lumps of alien materials and slag crust. The presence of the latter grate improves the operating conditions of the airlift, ruling out the chance of its being put out of action, which may be caused by large-size of alien matter getting into the airlift.

The slab 13 and the overflow wall 15 are oriented with regard to each other so as to ensure a maximum overflow front. The most practical and effective is the parallel arrangement of the slab 13 and the overflow wall 15, as is shown in FIG. 4.

In the bunker 3, the slab 13, the wall 15 and the grate 14 are arranged either in the direction of the outflow of pulp from the chute, i.e., along the zone $a$ as is shown in FIG. 3, or in the direction perpendicular to said zone $a$, as is shown in FIG. 5.

Due to the presence of the slab, wall and grate in the bunker 3, the pulp is divided into two phases, one of which, clarified water, is accumulated in the container 11 (FIG. 1), whereas the other, thickened pulp with a ratio between the solid and fluid phases of 1:1 or 1:2, is accumulated in the lower portion of the bunker 3.

The container 11 has an inclined bottom which in its lower portion communicates via a suction conduit 17 with a pump 18 which communicates via a pressure pipe 19 with the granulator 2 for the supply to the collector of said granulator of clarified water the latter being used to granulate fluid slag.

The granulation process is accompanied by the release of steam containing sulfur compounds, which steam has to be neutralized and removed. For thus purpose, provision is made for a scrubber 20 arranged above the bunker 3. The scrubber 20 has a collector 21 for the supply of alkaline water to remove sulfur compounds from the steam. Purified steam-and-air mixture is released into the atmosphere through a pipe 22 mounted on the scrubber 20.

The airlift 5 includes a nozzle 23 for the supply of compressed air and a rising pipe 24 to receive thickened pulp from the bunker 3 and forward it to the separator 6. The compressed air supply is indicated by arrow B.

The separator 6 communicates via a pipe 25 with the scrubber 20 for the removal of air from the airlift 5, said air being released into the atmosphere together with the harmless steam-and-air mixture.

The dehydration and drier means 7 comprises a turning dehydrator 26 and a bunker 27 for the accumulation of dehydrated granulated slag. Disposed under the dehydrator 26 is a bottom tray 28 for the accumulation of water filtered out in said dehydrator, said bottom plate communicating via a pipe 29 with the bunker 3 or the airlift 5 for the removal of filtered-off water.

The dehydrator 26 is set into rotation by an electromotor 30 via a reduction gear 31 and a gear drive 32.

The bunker 27 is provided with a collector 33 for the supply of air to dry dehydrated granulated slag in that bunker. The air supply is indicated by arrow C.

Arranged under the bunker 27 is a conveyor 34 to receive dehydrated granulated slag and forward it to a storage plot or to railway cars.

The proposed apparatus operates as follows.

Prior to putting the apparatus into operation, the bunker 3 is filled with water so that the water level is no less than 100 mm from the bottom 12 of the chute 1. The pump 18 is then brought into action and starts supplying water to the collector 9 of the granulator 2. Simultaneously, fluid slag is supplied through the nose 8 to the chute 1. Water passes under a high pressure through the perforated slab 10; the gush of water is directed at the fluid slag, granulating the latter. As is well known, granulation of fluid slag is accompanied by the production of pulp consisting of three phases one of which is water, the second is a steam-and-air mixture containing sulfur compounds, and the third is granulated slag.

The pulp produced in the course of the granulation process is directed in a downward flow to the bunker 3. As the pulp flow strikes against the water surface and the slab 13, its kinetic energy is damped. As a result and due to a difference of the specific weights of the pulp phases, the granulated slag, which is a heavier phase, is accumulated in the lower portion of the bunker 3; clarified water passes over the overflow wall 15 into the container 11. From that container water is again directed by the pump 18 to the granulator 2 for the next cycle of fluid slag granulation. Float fractions of the granulated slag are prevented from passing to the container 11 by the grate 14. If the pulp contains large-size lumps of alien materials and slag crust, these are prevented from getting into the bunker 3 by the grate 16. In the course of the following granulation cycle the lumps of alien matter are crushed by the pulp flow. The steam-and-air mixture containing sulfur compounds is supplied to the scrubber 20, wherein alkaline water is supplied to the collector 21. Under the action of said alkaline water the sulfur compounds are neutralized, and the purified steam-and-air mixture is released into the atmosphere through the pipe 22. Granulated slag and water accumulated in the lower portion of the bunker 3 make up thickened pulp with a ratio between the solid and fluid phases of 1:1 or 1:2. The thickened pulp is directed by gravity along the inclined walls of the bunker 3 and the inclined branch pipe 4 to the airlift 5. Compressed air is supplied through the nozzle 23 to the pipe 24, which air conveys the thickened pulp to the separator 6.

From said separator, separated air is directed via the pipe 25 to the scrubber 20, wherefrom it is released with the steam-and-air mixture, into the atmosphere. From the separator the thickened pulp is directed, by gravity, to the dehydrator 26. As the dehydrator 26 rotates, water is filtered off the thickened pulp and is drained to the bottom tray 28 through the reticular bottom. From the bottom tray water is directed through the pipe 29 to the bunker 3 and to the lower portion of the airlift 5 to roil the granulated slag settled there.

Dehydrated granulated slag is supplied to the bunker 27 where is is blown with air supplied from the collector 33 and dried. The dried granulated slag is directed to the conveyor 34 to be transported to a storage plot or to railway cars. Air from the bunker 27 is directed to the scrubber 27.

What is claimed is:

1. An apparatus for the production of granulated slag, comprising: a closed chute to receive fluid slag supplied from melting furnaces; a granulator arranged at the intake portion of said chute to granulate fluid slag to produce pulp; a bunker hermetically connected to the outlet portion of said chute to receive the downward pulp flow from said chute, said bunker being filled with water whose level is no less than 100 mm from the bottom of said chute in order to damp the kinetic energy of said downward pulp flow and minimize the disturbance of the water surface; a slab rigidly secured to the walls of said bunker, said slab being disposed outside the zone of direct impact of the downward pulp flow and being partially immersed with its edge into the water; a grate to catch light suspended matter in the pulp, said grate being arranged behind said slab, in the direction off said zone and adjoining said slab; an overflow wall adjoining said grate for the overflow of clarified water produced as a result of the damping of the kinetic energy of the pulp flow and removing light suspended matter therefrom; a container for the accumulation of clarified water, said container adjoining said bunker; an airlite connected to the lower portion of said bunker and intended to receive thickened pulp produced as granulated slag settles in the lower portion of said bunker; a dehydration and drying means for the dehydration and drying of thickened pulp supplied by the airlift, whereby dehydrated granulated slag is produced; and a means for the accumulation of said granulated slag.

2. An apparatus as claimed in claim 1, wherein said container for accumulation of clarified water communicates at its lower portion with a pump for the supply of said clarified water to said granulator.

3. An apparatus as claimed in claim 1, wherein arranged in said zone of direct impact of the downward pulp flow and below said water level is another grate for catching and crushing large-size lumps of alien matter and slag crust.

* * * * *